US012658697B2

(12) United States Patent
Liu et al.

(10) Patent No.: US 12,658,697 B2
(45) Date of Patent: Jun. 16, 2026

(54) METHOD FOR CALCULATING OPTIMAL ENERGY FLOW OF INTEGRATED ELECTRICITY-GAS SYSTEM BASED ON SEQUENTIAL CONVEX PROGRAMMING

(71) Applicants: Southeast University, Nanjing (CN); ELECTRIC POWER RESEARCH INSTITUTE OF YUNNAN POWER GRID CO., LTD., Yunnan (CN); YUNNAN POWER GRID CO., LTD., Yunnan (CN)

(72) Inventors: Pengxiang Liu, Nanjing (CN); Zhi Wu, Nanjing (CN); Hai Lu, Nanjing (CN); Wei Gu, Nanjing (CN); Yuping Lu, Nanjing (CN); Enbo Luo, Nanjing (CN); Dada Wang, Nanjing (CN); Qirun Sun, Nanjing (CN); Hao Zhang, Nanjing (CN)

(73) Assignees: SOUTHEAST UNIVERSITY, Nanjing (CN); ELECTRIC POWER RESEARCH INSTITUTE OF YUNNAN POWER GRID CO., LTD., Yunnan (CN); YUNNAN POWER GRID CO., LTD., Yunnan (CN)

( * ) Notice: Subject to any disclaimer, the term of this patent is extended or adjusted under 35 U.S.C. 154(b) by 530 days.

(21) Appl. No.: 18/029,973

(22) PCT Filed: Apr. 9, 2022

(86) PCT No.: PCT/CN2022/085985
§ 371 (c)(1),
(2) Date: Apr. 3, 2023

(87) PCT Pub. No.: WO2023/015923
PCT Pub. Date: Feb. 16, 2023

(65) Prior Publication Data
US 2023/0369852 A1 Nov. 16, 2023

(30) Foreign Application Priority Data
Aug. 11, 2021 (CN) .......................... 202110927842.1

(51) Int. Cl.
*H02J 3/00* (2026.01)
*H02J 103/30* (2026.01)

(52) U.S. Cl.
CPC ............. *H02J 3/00* (2013.01); *H02J 2103/30* (2026.01)

(58) Field of Classification Search
CPC ......... H02J 3/00; H02J 2203/20; G06F 30/20; G06F 2111/04; G06F 2113/14; G06Q 50/06
See application file for complete search history.

(56) References Cited

U.S. PATENT DOCUMENTS

2017/0184640 A1 6/2017 Pileggi et al.

FOREIGN PATENT DOCUMENTS

CN 108846507 A * 11/2018 ............. G06Q 10/04
CN 110729766 A * 1/2020 ............... H02J 3/46
(Continued)

*Primary Examiner* — Charles Cai
(74) *Attorney, Agent, or Firm* — MUNCY, GEISSLER, OLDS & LOWE, P.C.

(57) ABSTRACT

A method for calculating an optimal energy flow of an integrated electricity-gas system comprises: a convex optimization part of an optimal energy flow model is established according to a fuel cost of each thermal power unit node and a gas supply cost of each nature gas source node, and a convex relaxation formula of a quadratic constraint of the optimal energy flow model is established, and a convex function is expanded by a first order Taylor expansion at a relaxation solution to form an expansion formula; a precision requirement threshold value of a non-convex constraint is given, the threshold value is compared with an unbalance magnitude of a non-convex constraint in the expansion (Continued)

formula; when the unbalance magnitude is greater than the threshold value, the expansion is iterated into a solution model of the integrated electricity-gas hybrid energy system until the unbalance magnitude is not greater than the threshold value.

7 Claims, 1 Drawing Sheet

(56) References Cited

FOREIGN PATENT DOCUMENTS

| | | | | |
|---|---|---|---|---|
| CN | 112713615 A | * | 4/2021 | ............. H02J 3/466 |
| CN | 113627021 A | | 11/2021 | |

* cited by examiner

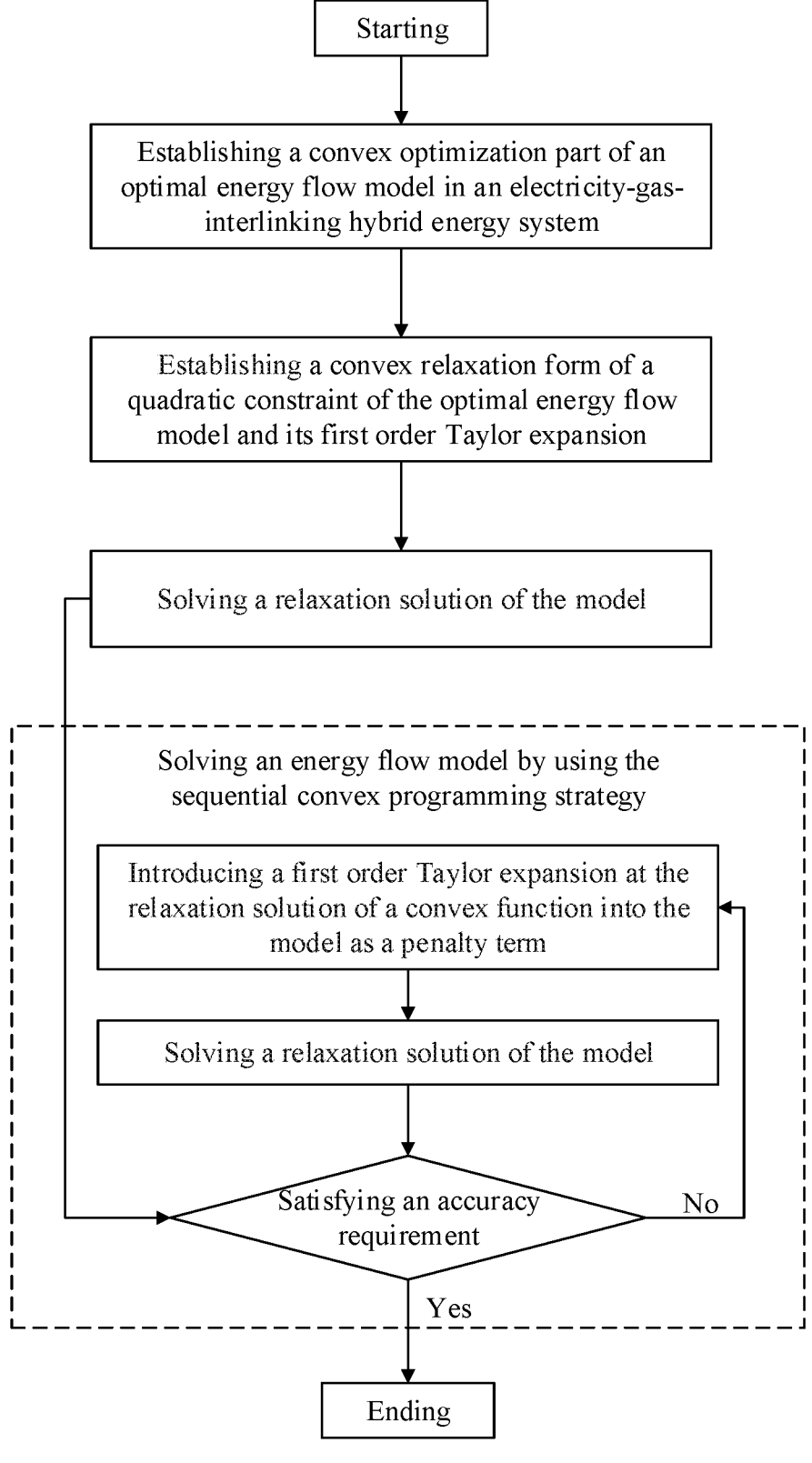

METHOD FOR CALCULATING OPTIMAL ENERGY FLOW OF INTEGRATED ELECTRICITY-GAS SYSTEM BASED ON SEQUENTIAL CONVEX PROGRAMMING

TECHNICAL FIELD

The present disclosure relates to the technical field of an optimal energy flow of an integrated electricity-gas system, and in particular to a method for calculating an optimal energy flow of an integrated electricity-gas system based on sequential convex programming.

BACKGROUND

With the rapid development of energy revolution, the hybrid energy system constructed by the coupling of the electrical power system and the nature gas system has become an important development direction on the optimization of energy structure in China. The multi-energy inter-linking hybrid energy system has broken the operation barrier of the traditional energy system, has realized the mutual coupling, substitution and supplement of the multi-energy form, and has promoted the diversified utilization of energy. The calculation of optimal energy flow of the integrated electricity-gas system is one of the important theoretical bases for researching the planning and operation of the system.

At present, the greatest difficulty in solving this problem is the non-convex constraint in the optimal energy flow model of the integrated electricity-gas system. Although the traditional method for calculating the optimal energy flow based on a convex relaxation strategy has relatively high calculation speed, it frequently fails to satisfy the requirements of calculation accuracy, and the obtained solutions cannot guarantee the feasibility requirements for non-convex constraints. Therefore, it is extremely important for the development of the integrated electricity-gas system to provide an algorithm that can efficiently solve the non-convex optimization problem of the optimal energy flow of the integrated electricity-gas system.

SUMMARY

The objectives of the present disclosure are to provide a method for calculating an optimal energy flow of an integrated electricity-gas system based on sequential convex programming, by adding the unbalance magnitude of the non-convex constraints into the optimization objective as a penalty factor, thereby guaranteeing the feasibility and tightness of the solutions and guaranteeing the feasibility of the non-convex constraints.

In order to solve the above problems, the present disclosure is achieved by the following technical solutions.

Provided in the present disclosure is a method for calculating an optimal energy flow of an integrated electricity-gas system based on sequential convex programming. The method comprises the following steps.

A convex relaxation formula of a quadratic constraint of an optimal energy flow model is established in an integrated electricity-gas hybrid energy system, and a convex function is expanded by a first order Taylor expansion at a relaxation solution to form an expansion.

A precision requirement threshold value of a non-convex constraint is given, the threshold value is compared with an unbalance magnitude of the non-convex constraint in the expansion formula.

When the unbalance magnitude is greater than the threshold value, the expansion formula is iterated into a solution model of the integrated electricity-gas hybrid energy system until the unbalance magnitude is not greater than the threshold value, to obtain a relaxation solution in the solution model.

Further, iterating the expansion formula into a solution model of the integrated electricity-gas hybrid energy system includes as follows.

The precision requirement threshold value of the non-convex constraint is given, an unbalance magnitude obtained from a difference of the convex relaxation formula of the quadratic constraint is compared with the threshold value.

When the unbalance magnitude is not greater than a set precision requirement threshold value of the non-convex constraint, the expansion formula is solved according to an energy flow model.

When the unbalance magnitude is greater than the set precision requirement threshold value of the non-convex constraint, the first order Taylor expansion at the relaxation solution of the convex function is introduced into the model as a penalty term, a relaxation solution is recalculated with the penalty term of the model;

Before the relaxation solution with the penalty term of the model is calculated, the unbalance magnitude of an solved expansion formula of the relaxation formula after the penalty term is introduced is compared with the threshold value, when the unbalance magnitude is greater than the set precision requirement threshold value of the non-convex constraint, the penalty term is iterated until the unbalance magnitude is not greater than the set precision requirement threshold value of the non-convex constraint.

Further, before establishing the convex relaxation formula of the quadratic constraint of the optimal energy flow model, a convex optimization part of the optimal energy flow model is established according to a fuel cost of each thermal power unit node and a gas supply cost of each nature gas source node in the integrated electricity-gas hybrid energy system;

The constraints in the electricity-gas interlinking hybrid energy system include a power flow constraint of an electrical power system and a power flow constraint of a gas system, a power flow model of the electrical power system and a power flow model of the gas system are both quadratic nonlinear models.

Further, an objective function of the convex optimization part of the optimal energy flow model in the integrated electricity-gas system is established as:

$$\min \sum_{i \in \Omega_c} \left[ C_i^a (p_i^c)^2 + C_i^b p_i^c + C_i^c \right] + \sum_{i \in \Omega_s} C_m^f f_m^s,$$

where sets $\Omega_c$ and $\Omega_s$ represent a thermal power unit node set and a nature gas source node set respectively, a variable $$p_i^c$$

represents an active power of the thermal power unit, a variable $$f_m^s$$

represents a gas supply rate of the nature gas source, parameters $$C_i^a, C_i^b \text{ and } C_i^c$$

represent a second-order term coefficient, a first-order term coefficient and a zero-order term coefficient of the fuel cost in the thermal power unit respectively, and $$C_m^f$$

represents a gas supply cost coefficient of the nature gas source.

Further, a linear part of the power flow constraints of the gas system is as follows:

$$\sum_{ji \in \beta_i} (p_{ji} - l_{ji}R_{ji}) - \sum_{ik \in \alpha_i} p_{ik} + p_i^c + p_i^g = D_i^p, \forall i \in \Omega_b$$

$$\sum_{ji \in \beta_i} (q_{ji} - l_{ji}X_{ji}) - \sum_{ik \in \alpha_i} q_{ik} + q_i^c + q_i^g = D_i^q, \forall i \in \Omega_b$$

$$v_i - 2(p_{ij}R_{ij} + q_{ij}X_{ij}) + l_{ij} \left(R_{ij}^2 + X_{ij}^2\right) = v_j, \forall ij \in \Omega_l$$

$$\left(V_i^{min}\right)^2 \le v_i \le (V_i^{max})^2, \forall i \in \Omega_b$$

$$P_{c,i}^{min} \le p_i^c \le P_{c,i}^{max}, Q_{c,i}^{min} \le q_i^c \le Q_{c,i}^{max}, \forall i \in \Omega_c$$

$$P_{g,i}^{min} \le p_i^g \le P_{g,i}^{max}, Q_{g,i}^{min} \le q_i^g \le Q_{g,i}^{max}, \forall i \in \Omega_g$$

$$P_{ij}^{min} \le p_{ij} \le P_{ij}^{max}, \forall ij \in \Omega_l$$

$$Q_{ij}^{min} \le q_{ij} \le Q_{ij}^{max}, \forall ij \in \Omega_l$$

$$0 \le l_{ij} \le \left(I_{ij}^{max}\right)^2, \forall ij \in \Omega_l,$$

where, sets $\Omega_b$, $\Omega_l$ and $\Omega_g$ represent an electrical grid node set, an electrical transmission lines set and a gas generator node set respectively, sets $\alpha_i$ and $\beta_i$ represent an electrical transmission line set with a node i as a head-terminal node and an electrical transmission line set with the node i as a tail-terminal node respectively, variables $p_{ij}$, $p_{ji}$ and $p_{ik}$ represent active powers flowing over lines ij, ji and ik, $q_{ij}$, $q_{ji}$ and $q_{ik}$ represent reactive powers flowing over the lines ij, ji and ik, $l_{ij}$ and $l_{ji}$ represent squares of currents flowing over the lines ij and ji, $$p_i^c \text{ and } q_i^c$$

represent an active power and a reactive power output by the thermal power unit respectively, $$p_i^g \text{ and } q_i^g$$

represent an active power and a reactive power output by the gas generator respectively, $v_i$ and $v_j$ represent squares of voltage amplitudes of the node i and a node j, parameters $R_{ij}$ and $R_{ji}$ represent resistances on the line ij and the line ji respectively, $X_{ij}$ and $X_{ji}$ represent reactances on the line ij and the line ji respectively, $$D_i^p \text{ and } D_i^q$$

represent an active load and a reactive load of the node i respectively, $$V_i^{min} \text{ and } V_i^{max}$$

represent a lower limit and an upper limit of the voltage amplitude of the node i respectively, $$P_{c,i}^{min} \text{ and } P_{c,i}^{max}$$

represent a lower limit and an upper limit of the active power output by a thermal power unit i respectively, $$Q_{c,i}^{min} \text{ and } Q_{c,i}^{max}$$

represent a lower limit and an upper limit of the reactive power output by the thermal power unit i respectively, $$P_{g,i}^{min} \text{ and } P_{g,i}^{max}$$

represent a lower limit and an upper limit of the active power output by a gas power unit i respectively, $$Q_{g,i}^{min} \text{ and } Q_{g,i}^{max}$$

represent a lower limit and an upper limit of the reactive power output by the gas power unit i respectively, $$P_{ij}^{min} \text{ and } P_{ij}^{max}$$

represent a transmission lower limit and a transmission upper limit of the active power on an electrical transmission line ij respectively, $$Q_{ij}^{min} \text{ and } Q_{ij}^{max}$$

represent a transmission lower limit and a transmission upper limit of the reactive power on the electrical transmission line ij respectively, $$I_{ij}^{max}$$

represents a heat stable current value for the line ij.

Further, a linear part of the power flow constraints of the gas system is as follows:

$$\sum_{im\in\delta_m}(e_{im}-\tau_{im})-\sum_{mn\in\gamma_m}e_{mn}-\sum_{mn\in\Xi_m}f_{mn}+f_m^s-f_m^g=D_m^g,\ \forall\ m\in\Omega_n$$

$$\tau_{mn}=K_{mn}e_{mn},\ \forall\ mn\in\Omega_k$$

$$(H_{mn}^{min})^2\pi_m\le\pi_n\le(H_{mn}^{max})^2\pi_m,\ \forall\ mn\in\Omega_k$$

$$p_i^g=T_mf_m^g,\ \forall\ i,m\in\Omega_g$$

$$\left(\prod_m^{min}\right)^2\le\pi_m\le\left(\prod_m^{max}\right)^2,\ \forall\ m\in\Omega_n$$

$$-F_{mn}^{max}\le f_{mn}\le F_{mn}^{max},\ \forall\ mn\in\Omega_p$$

$$0\le e_{mn}\le E_{mn}^{max},\ \forall\ mn\in\Omega_k$$

$$0\le f_m^g\le F_{g,m}^{max},\ \forall\ m\in\Omega_g$$

$$F_{s,m}^{min}\le f_m^s\le F_{s,m}^{max},\ \forall\ m\in\Omega_s,$$

where sets $\Omega_n$, $\Omega_p$ and $\Omega_k$ represent a gas node set, a gas pipeline set and a nature gas compressor set respectively, sets $\delta_m$ and $\gamma_m$ represent a gas pipeline set with a node m as head-terminal node and a gas pipeline set with the node m as a tail-terminal node respectively, $\Xi_m$ represents a nature gas compressor set with node m as a gas-intake node, $e_{im}$ and $e_{mn}$ represent a gas amount flowing through a nature gas compressor im and a gas amount flowing through a nature gas compressor mn, $\tau_{im}$ and $\tau_{mn}$ represent a gas amount consumed by the nature gas compressor im and a gas amount consumed by the nature gas compressor mn respectively, $f_{mn}$ represents a gas amount flowing through a gas pipeline mn, $$f_m^s$$

represents a nature gas amount injected into the node m by the nature gas source per unit time, $$f_m^g$$

represents a gas consumption amount by a gas generator connected to the node m per unit time, $\pi_m$ and $\pi_n$ represent squares of gas pressure values at the node m and a node n respectively, a parameter $$D_m^g$$

represents a gas load at the node m, $W_{mn}$ represents a Weymouth coefficient of a gas transmission pipeline mn, $K_{mn}$ represents a ratio coefficient of a gas compression amount and a gas consumption amount per unit time of the nature gas compressor, $$H_{mn}^{min}\ \text{and}\ H_{mn}^{max}$$

represent a lower limit and an upper limit of a compression ratio of the nature gas compressor, $T_m$ represents a ratio coefficient of the gas consumption amount and a power generation amount of the gas generator, $$\prod_m^{min}\ \text{and}\ \prod_m^{max}$$

represent a lower limit and an upper limit of a nodal pressure, $$F_{mn}^{min}\ \text{and}\ F_{mn}^{max}$$

represent a lower limit and an upper limit of a gas transmission amount of the gas pipeline mn per unit time, $$E_{mn}^{max}$$

represents an upper limit of a compression rate of the nature gas compressor, $$F_{g,m}^{max}$$

represents an upper limit of a gas consumption rate of the gas generator, $$F_{s,m}^{min}\ \text{and}\ F_{s,m}^{max}$$

represent a lower limit and an upper limit of a gas supply amount of the nature gas source per unit time.

Further, the model is expressed in a matrix form:

$$\min\ x^TQx+cx+d$$

$$\text{s.t.}\ \ Ax\le b,$$

where matrices Q, c, d represent a second-order term coefficient, a first-order term coefficient and a constant term matrix in the objective function respectively, a matrix A represents a coefficient matrix in the linear constraint, and b represents a constant term coefficient matrix in the linear constraint.

Further, the convex relaxation formula of the quadratic constraint of the electricity-gas interlinking hybrid energy system is:

$$(p_{ij})^2+(q_{ij})^2\le v_il_{ij},\ \forall\ ij\in\Omega_l$$

$$W_{mn}(f_{mn})^2\le\pi_m-\pi_n,\ \forall\ mn\in\Omega_p,$$

the first order Taylor expansion is:

$$(l_{ij}+v_i)^2-8p_{ij}^*p_{ij}-8q_{ij}^*q_{ij}+4(p_{ij}^*)^2+$$

$$4(q_{ij}^*)^2+(l_{ij}^*-v_i^*)^2-2(l_{ij}^*-v_i^*)(l_{ij}-v_i)\le\mu_{ij}^l,\ \forall\ ij\in\Omega_l$$

$$(\pi_m-\pi_n)-2W_{mn}f_{mn}^*f_{mn}+W_{mn}(f_{mn}^*)^2\le\mu_{mn}^p,\ \forall\ mn\in\Omega_p,$$

$$\text{where}\ p_{ij}^*,q_{ij}^*,l_{ij}^*,v_i^*\ \text{and}\ f_{mn}^*$$

respectively represents a given value for a corresponding variable, namely, a value for a line active power, a value for a line reactive power, a square value for a line current, a square value for a node voltage, and a value for a pipeline gas flow optimized and obtained in a previous iteration, variables $$\mu_{ij}^l \text{ and } \mu_{mn}^p$$

respectively represent an unbalance magnitude of a non-convex constraint of a corresponding line ij and the gas transmission pipeline mn.

The present disclosure has the following beneficial effects.

The existing researches on the method for calculating an optimal energy flow of an integrated electricity-gas system lacks the effective means to deal with non-convex constraints. The traditional convex relaxation techniques are usually difficult to ensure the relaxation tightness, which leads to infeasible solutions. The present disclosure adopts the solution idea of sequential convex programming, and adds the unbalance of non-convex constraint into the optimization objective as a penalty factor to ensure the feasibility and tightness of the solution.

In order to ensure the feasibility of the solution, the existing researches on the method for calculating an optimal energy flow of an integrated electricity-gas system frequently need to adopt a more complex global optimization algorithm to solve, which leads to a low efficiency of the solution and cannot be applied to the power flow calculation of super large-scale energy system. The power flow calculation method based on sequential convex programming provided in the present disclosure is to solve based on the convex optimization problem in each iteration, therefore on the basis of ensuring the feasibility of the solution, the high efficiency of the solution is taken into account.

Certainly, the implementation of any product of the present disclosure is not necessary to achieve all the advantages described above at the same time.

BRIEF DESCRIPTION OF THE DRAWINGS

In order to illustrate the technical solutions of the embodiments in the present disclosure more clearly, the following will give a brief introduction to the drawings needed for the description of the embodiments. It will be apparent that the drawings described below are only some embodiments of the present disclosure, for ordinary who skilled in the art, other drawings can be obtained according to these drawings without any creative effort.

The FIGURE illustrates a schematic diagram of solving the relaxation solution of the model.

DETAILED DESCRIPTION OF THE EMBODIMENTS

The following will clearly and completely describe the technical solutions in the embodiments of the present disclosure in combination with the drawings of the embodiments in the present disclosure. It will be apparent that the described embodiments are only some of the embodiments in the present disclosure, but not all of the embodiments. Based on the embodiments in the present disclosure, all other embodiments obtained by those skilled in the art without creative effort are within the protection scope of the present disclosure.

With reference to the FIGURE, provided in the present disclosure is a method for calculating an optimal energy flow of an integrated electricity-gas system based on sequential convex programming. The method is implemented through the following steps.

In Step 1, a convex optimization part of an optimal energy flow model in the integrated electricity-gas system is established.

In Step 101, an objective function is:

$$\min \sum_{i \in \Omega_c} \left[ C_i^a (p_i^c)^2 + C_i^b p_i^c + C_i^c \right] + \sum_{i \in \Omega_s} C_m^f f_m^s$$

where sets $\Omega_c$ and $\Omega_s$ represent a thermal power unit node set and a nature gas source node set respectively, a variable $$p_i^c$$

represents an active power of the thermal power unit, a variable $$f_m^s$$

represents a gas supply rate of the nature gas source, parameters $$C_i^a, C_i^b \text{ and } C_i^c$$

represent a second-order term coefficient, a first-order term coefficient and a zero-order term coefficient of the fuel cost in the thermal power unit respectively, and $$C_m^f$$

represents a gas supply cost coefficient of the nature gas source.

In Step 102, a linear part of the power flow constraints of the electrical power system is as follows:

$$\sum_{ji \in \beta_i} (p_{ji} - l_{ji} R_{ji}) - \sum_{ik \in \alpha_i} p_{ik} + p_i^c + p_i^g = D_i^p, \forall i \in \Omega_b$$

$$\sum_{ji \in \beta_i} (q_{ji} - l_{ji} X_{ji}) - \sum_{ik \in \alpha_i} q_{ik} + q_i^c + q_i^g = D_i^q, \forall i \in \Omega_b$$

$$v_i - 2(p_{ij} R_{ij} + q_{ij} X_{ij}) + l_{ij}, (R_{ij}^2 + X_{ij}^2) = v_j, \forall ij \in \Omega_l$$

$$(V_i^{min})^2 \le v_i \le (V_i^{max})^2, \forall i \in \Omega_b$$

$$P_{c,i}^{min} \le p_i^c \le P_{c,i}^{max}, Q_{c,i}^{min} \le q_i^c \le Q_{c,i}^{max}, \forall i \in \Omega_c$$

$$P_{g,i}^{min} \le p_i^g \le P_{g,i}^{max}, Q_{g,i}^{min} \le q_i^g \le Q_{g,i}^{max}, \forall i \in \Omega_g$$

$$P_{ij}^{min} \le p_{ij} \le P_{ij}^{max}, \forall ij \in \Omega_l$$

-continued $$Q_{ij}^{min} \le q_{ij} \le Q_{ij}^{max}, \; \forall \; ij \in \Omega_l$$

$$0 \le l_{ij} \le \left(I_{ij}^{max}\right)^2, \; \forall \; ij \in \Omega_l,$$

where, sets $\Omega_b$, $\Omega_l$ and $\Omega_g$ represent an electrical grid node set, an electrical transmission lines set and a gas generator node set respectively, sets $\alpha_i$ and $\beta_i$ represent an electrical transmission line set with a node i as a head-terminal node and an electrical transmission lines set with the node i as a tail-terminal node respectively, variables $p_{ij}$, $p_{ji}$ and $p_{ik}$ represent active powers flowing over lines ij, ji and ik, $q_{ij}$, $q_{ji}$ and $q_{ik}$ represent reactive powers flowing over the lines ij, ji and ik, $l_{ij}$ and $l_{ji}$ represent squares of currents flowing over the lines ij and ji, $$p_i^c \text{ and } q_i^c$$

represent an active power and a reactive power output by the thermal power unit respectively, $$p_i^g \text{ and } q_i^g$$

represent an active power and a reactive power output by the gas generator respectively, $v_i$ and $v_j$ represent squares of voltage amplitudes of the node i and a node j, parameters $R_{ij}$ and $R_{ji}$ represent resistances on the lines ij and the line ji respectively, $X_{ij}$ and $X_{ji}$ represent reactances on the line ij and the line ji respectively, $$D_i^p \text{ and } D_i^q$$

represent an active load and a reactive load of the node i respectively, $$V_i^{min} \text{ and } V_i^{max}$$

represent a lower limit and an upper limit of the voltage amplitude of the node i respectively, $$P_{c,i}^{min} \text{ and } P_{c,i}^{max}$$

represent a lower limit and an upper limit of the active power output by a thermal power unit i respectively, $$Q_{c,i}^{min} \text{ and } Q_{c,i}^{max}$$

represent a lower limit and an upper limit of the reactive power output by the thermal power unit i respectively, $$P_{g,i}^{min} \text{ and } P_{g,i}^{max}$$

represent a lower limit and an upper limit of the active power output by a gas power unit i respectively, $$Q_{g,i}^{min} \text{ and } Q_{g,i}^{max}$$

represent a lower limit and an upper limit of the reactive power output by the gas power unit i respectively, $$P_{ij}^{min} \text{ and } P_{ij}^{max}$$

represent a transmission lower limit and a transmission upper limit of the active power on an electrical transmission line ij respectively, $$Q_{ij}^{min} \text{ and } Q_{ij}^{max}$$

represent a transmission lower limit and a transmission upper limit of the reactive power on the electrical transmission line ij respectively, $$I_{ij}^{max}$$

represents a heat stable current value for the line ij.

In Step 103, a linear part of the power flow constraints of the gas system is as follows:

$$\sum_{im \in \delta_m} (e_{im} - \tau_{im}) - \sum_{mn \in \gamma_m} e_{mn} - \sum_{mn \in \Xi_m} f_{mn} + f_m^s - f_m^g = D_m^g, \; \forall \; m \in \Omega_n$$

$$\tau_{mn} = K_{mn} e_{mn}, \; \forall \; mn \in \Omega_k$$

$$\left(H_{mn}^{min}\right)^2 \pi_m \le \pi_n \le (H_{mn}^{max})^2 \pi_m, \; \forall \; mn \in \Omega_k$$

$$p_i^g = T_m f_m^g, \; \forall \; i, m \in \Omega_g$$

$$\left(\prod_m^{min}\right)^2 \le \pi_m \le \left(\prod_m^{max}\right)^2, \; \forall \; m \in \Omega_n$$

$$-F_{mn}^{max} \le f_{mn} \le F_{mn}^{max}, \; \forall \; mn \in \Omega_p$$

$$0 \le e_{mn} \le E_{mn}^{max}, \; \forall \; mn \in \Omega_k$$

$$0 \le f_m^g \le F_{g,m}^{max}, \; \forall \; m \in \Omega_g$$

$$F_{s,m}^{min} \le f_m^s \le F_{s,m}^{max}, \; \forall \; m \in \Omega_s,$$

where sets $\Omega_n$, $\Omega_p$ and $\Omega_k$ represent a gas node set, a gas pipeline set and a nature gas compressor set respectively, sets $\delta_m$ and $\gamma_m$ represent a gas pipeline set with a node m as a head-terminal node and a gas pipeline set with the node m as a tail-terminal node respectively, $\Xi_m$ represents a nature gas compressor set with node m as a gas-intake node, $e_{im}$ and $e_{mn}$ represent a gas amount flowing through a nature gas compressor im and a gas amount flowing through a nature gas compressor mn, $\tau_{im}$ and $\tau_{mn}$ represent a gas amount consumed by the nature gas compressor im and a gas amount consumed by the nature gas compressor mn respectively, $f_{mn}$ represents a gas amount flowing through a gas pipeline mn, $$f_m^s$$

represents a nature gas amount injected into the node m by the nature gas source per unit time, $$f_m^g$$

represents a gas consumption amount by a gas generator connected to the node m per unit time, $\pi_m$ and $\pi_n$ represent squares of gas pressure values at the node m and a node n respectively, a parameter $$D_m^g$$

represents a gas load at the node m, $W_{mn}$ represents a Weymouth coefficient of a gas transmission pipeline mn, $K_{mn}$ represents a ratio coefficient of a gas compression amount and a gas consumption amount per unit time of the nature gas compressor, $$H_{mn}^{min} \text{ and } H_{mn}^{max}$$

represent a lower limit and an upper limit of a compression ratio of the nature gas compressor, $T_m$ represents a ratio coefficient of the gas consumption amount and a power generation amount of the gas generator, $$\textstyle\prod_m^{min} \text{ and } \textstyle\prod_m^{max}$$

represent a lower limit and an upper limit of a nodal pressure, $$F_{mn}^{min} \text{ and } F_{mn}^{max}$$

represent a lower limit and an upper limit of a gas transmission amount of the gas pipeline mn per unit time, $$E_{mn}^{max}$$

represents an upper limit of a compression rate of the nature gas compressor, $$F_{g,m}^{max}$$

represents an upper limit of a gas consumption rate of the gas generator, $$F_{s,m}^{min} \text{ and } F_{s,m}^{max}$$

represent a lower limit and an upper limit of a gas supply amount of the nature gas source per unit time.

In Step 104, the above model is expressed in a matrix form as follows:

$$\min x^T Q x + c x + d$$
$$\text{s.t. } Ax \le b,$$

where matrices Q, c, d represent a second-order term coefficient, a first-order term coefficient and a constant term matrix in the objective function respectively, a matrix A represents a coefficient matrix in the linear constraint, and b represents a constant term coefficient matrix in the linear constraint.

In Step 2, a convex relaxation formula of a quadratic constraint of the optimal energy flow model and its first order Taylor expansion are established.

Specifically, the convex relaxation formula of the quadratic constraint of the optimal energy flow model is established in an integrated electricity-gas hybrid energy system, and a convex function is expanded by the first order Taylor expansion at a relaxation solution to form expansion formulas, the expansion formulas described below are Taylor expansion formulas. In other words. That is, linear constraints are established by the optimal energy flow model based on the first-order Taylor expansion instead of the quadratic constraints, and solutions of the model at this time are approximate solutions.

A precision requirement threshold value of a non-convex constraint is given, then the set threshold value is compared with an unbalance magnitude of the non-convex constraint in the expansion formula, and whether to solve the model is determined according to the comparison results.

When the unbalance magnitude is greater than the threshold value, the expansion formula is iterated into a solution model of the integrated electricity-gas hybrid energy system until the unbalance magnitude is not greater than the threshold value, to obtain a relaxation solution in the solution model.

For the unbalance magnitude mentioned above, the approximate solutions may not satisfy an original quadratic constraint, and the shortest distance between the approximate solutions and a feasible domain is the unbalance magnitude.

Specifically, iterating the expansion formula into a solution model of the integrated electricity-gas hybrid energy system includes as follows.

The precision requirement threshold value of the non-convex constraint is given, an unbalance magnitude obtained from a difference of the convex relaxation formula of the quadratic constraint is compared with the threshold value.

When the unbalance magnitude is not greater than a set precision requirement threshold value of the non-convex constraint, the expansion formula is solved according to an energy flow model.

When the unbalance magnitude is greater than the set precision requirement threshold value of the non-convex constraint, the first order Taylor expansion at the relaxation solution of the convex function is introduced into the model as a penalty term, a relaxation solution is recalculated with the penalty term of the model.

Before the relaxation solution with the penalty term of the model is calculated, the unbalance magnitude of an solved expansion formula of the relaxation formula after the penalty term is introduced is compared with the threshold value, when the unbalance magnitude is greater than the set precision requirement threshold value of the non-convex constraint, the penalty term is iterated until the unbalance magnitude is not greater than the set precision requirement threshold value of the non-convex constraint.

The actual calculation processes are as follows.

In Step 201, the convex relaxation formula of the quadratic constraint of the electricity-gas interconnected hybrid energy system is:

$$(p_{ij})^2 + (q_{ij})^2 \leq v_i l_{ij}, \forall\, ij \in \Omega_l$$

$$W_{mn}(f_{mn})^2 \leq \pi_m - \pi_n, \forall\, mn \in \Omega_p.$$

In Step 202, a first order Taylor expansion formula of the above constraint is:

$$(l_{ij} + v_i)^2 - 8p_{ij}^* p_{ij} - 8q_{ij}^* q_{ij} + 4(p_{ij}^*)^2 + 4(q_{ij}^*)^2 + (l_{ij}^* + v_i^*)^2$$
$$- 2(l_{ij}^* - v_i^*)(l_{ij} - v_i) \leq \mu_{ij}^l, \forall\, ij \in \Omega_l$$

$$(\pi_m - \pi_n) - 2W_{mn}f_{mn}^* f_{mn} + W_{mn}(f_{mn}^*)^2 \leq \mu_{mn}^p, \forall\, mn \in \Omega_p, \text{ where}$$

$$p_{ij}^*, q_{ij}^*, l_{ij}^*, v_i^* \text{ and } f_{mn}^*$$

respectively represents a given value for a corresponding variable, namely, a value for a line active power, a value for a line reactive power, a square value for a line current, a square value for a node voltage, and a value for a pipeline gas flow optimized and obtained in a previous iteration, variables $$\mu_{ij}^l \text{ and } \mu_{mn}^p$$

respectively represents an unbalance magnitude of a non-convex constraint of a corresponding line ij and the gas transmission pipeline mn.

In Step 3, the sequential convex programming strategy is used to solve the optimal energy flow model iteratively.

In Step 301, the precision requirement threshold value ε of the non-convex constraint is set, and the counter is set to be k=0.

In Step 302, the model is solved $$\min x^T Q x + cx + d$$
$$\text{s.t. } Ax \leq b$$

to obtain the current solutions $$p_{ij}^*, q_{ij}^*, l_{ij}^*, v_i^* \text{ and } f_{mn}^*$$

of the variables $$p_{ij}, q_{ij}, l_{ij}, v_i \text{ and } f_{mn}.$$

In Step 303, whether the unbalance magnitude of the non-convex constraint is satisfied is determined $$v_i^* l_{ij}^* - (p_{ij}^*)^2 - (q_{ij}^*)^2 \leq \varepsilon, \forall\, ij \in \Omega_l$$
$$\pi_m^* - \pi_n^* - W_{mn}(f_{mn}^*)^2 \leq \varepsilon, \forall\, mn \in \Omega_p$$

when the accuracy requirement is satisfied, the calculation results are output; if not, Step 304 is executed.

In Step 304, the model is solved $$\min x^T Q x + cx + d + 2^k\left(\sum_{ij \in \Omega_l} \mu_{ij}^l + \sum_{mn \in \Omega_p} \mu_{mn}^p\right)$$

$$\text{s.t. } Ax \leq b$$

$$(l_{ij} + v_i)^2 - 8p_{ij}^* p_{ij} - 8q_{ij}^* q_{ij} + 4(p_{ij}^*)^2 +$$
$$4(q_{ij}^*)^2 + (l_{ij}^* - v_i^*)^2 - 2(l_{ij}^* - v_i^*)(l_{ij} - v_i) \leq \mu_{ij}^l, \forall\, ij \in \Omega_l$$
$$(\pi_m - \pi_n) - 2W_{mn}f_{mn}^* f_{mn} + W_{mn}(f_{mn}^*)^2 \leq \mu_{mn}^p, \forall\, mn \in \Omega_p.$$

In Step 305, whether the unbalance magnitude of the non-convex constraint is satisfied is determined $$v_i^* l_{ij}^* - (p_{ij}^*)^2 - (q_{ij}^*)^2 \leq \varepsilon, \forall\, ij \in \Omega_l$$
$$\pi_m^* - \pi_n^* - W_{mn}(f_{mn}^*)^2 \leq \varepsilon, \forall\, mn \in \Omega_p$$

when accuracy requirement is satisfied, the calculation results are output; if not, the current solutions $$p_{ij}^*, q_{ij}^*, l_{ij}^*, v_i^* \text{ and } f_{mn}^*$$

of the variables $$p_{ij}, q_{ij}, l_{ij}, v_i \text{ and } f_{mn}$$

are obtained, and Step 304 is executed.

The following is an example of testing the integrated electricity-gas hybrid energy system, whose system parameters are as shown in Table 1 to Table 9.

TABLE 1

| | Node parameters for an electrical power system | | | | | |
|---|---|---|---|---|---|---|
| Serial number | Active load (MW) | Reactive load (MVAr) | Lower voltage limit (p.u.) | Upper voltage limit (p.u.) | Voltage reference (kV) | Load rejection cost ($/MWh) |
| 0 | 97.6 | 44.2 | 0.94 | 1.06 | 345 | 1000 |
| 1 | 0 | 0 | 0.94 | 1.06 | 345 | 1000 |
| 2 | 322 | 2.4 | 0.94 | 1.06 | 345 | 1000 |
| 3 | 500 | 184 | 0.94 | 1.06 | 345 | 1000 |
| 4 | 0 | 0 | 0.94 | 1.06 | 345 | 1000 |
| 5 | 0 | 0 | 0.94 | 1.06 | 345 | 1000 |
| 6 | 233.8 | 84 | 0.94 | 1.06 | 345 | 1000 |
| 7 | 522 | 176.6 | 0.94 | 1.06 | 345 | 1000 |
| 8 | 6.5 | −66.6 | 0.94 | 1.06 | 345 | 1000 |
| 9 | 0 | 0 | 0.94 | 1.06 | 345 | 1000 |
| 10 | 0 | 0 | 0.94 | 1.06 | 345 | 1000 |

TABLE 1-continued

Node parameters for an electrical power system

| Serial number | Active load (MW) | Reactive load (MVAr) | Lower voltage limit (p.u.) | Upper voltage limit (p.u.) | Voltage reference (kV) | Load rejection cost ($/MWh) |
|---|---|---|---|---|---|---|
| 11 | 8.53 | 88 | 0.94 | 1.06 | 345 | 1000 |
| 12 | 0 | 0 | 0.94 | 1.06 | 345 | 1000 |
| 13 | 0 | 0 | 0.94 | 1.06 | 345 | 1000 |
| 14 | 320 | 153 | 0.94 | 1.06 | 345 | 1000 |
| 15 | 329 | 32.3 | 0.94 | 1.06 | 345 | 1000 |
| 16 | 0 | 0 | 0.94 | 1.06 | 345 | 1000 |
| 17 | 158 | 30 | 0.94 | 1.06 | 345 | 1000 |
| 18 | 0 | 0 | 0.94 | 1.06 | 345 | 1000 |
| 19 | 680 | 103 | 0.94 | 1.06 | 345 | 1000 |
| 20 | 274 | 115 | 0.94 | 1.06 | 345 | 1000 |
| 21 | 0 | 0 | 0.94 | 1.06 | 345 | 1000 |
| 22 | 247.5 | 84.6 | 0.94 | 1.06 | 345 | 1000 |
| 23 | 308.6 | −92.2 | 0.94 | 1.06 | 345 | 1000 |
| 24 | 224 | 47.2 | 0.94 | 1.06 | 345 | 1000 |
| 25 | 139 | 17 | 0.94 | 1.06 | 345 | 1000 |
| 26 | 281 | 75.5 | 0.94 | 1.06 | 345 | 1000 |
| 27 | 206 | 27.6 | 0.94 | 1.06 | 345 | 1000 |
| 28 | 283.5 | 26.9 | 0.94 | 1.06 | 345 | 1000 |
| 29 | 0 | 0 | 0.94 | 1.06 | 345 | 1000 |
| 30 | 9.2 | 4.6 | 0.94 | 1.06 | 345 | 1000 |
| 31 | 0 | 0 | 0.94 | 1.06 | 345 | 1000 |
| 32 | 0 | 0 | 0.94 | 1.06 | 345 | 1000 |
| 33 | 0 | 0 | 0.94 | 1.06 | 345 | 1000 |
| 34 | 0 | 0 | 0.94 | 1.06 | 345 | 1000 |
| 35 | 0 | 0 | 0.94 | 1.06 | 345 | 1000 |
| 36 | 0 | 0 | 0.94 | 1.06 | 345 | 1000 |
| 37 | 0 | 0 | 0.94 | 1.06 | 345 | 1000 |
| 38 | 1104 | 250 | 0.94 | 1.06 | 345 | 1000 |

TABLE 2

Node parameters for a gas system

| Serial number | Gas load (1000 m3/h) | Lower pressure limit (bar) | Upper pressure limit (bar) | Load rejection cost ($/1000 m3) |
|---|---|---|---|---|
| 0 | 0 | 40 | 70 | 1000 |
| 1 | 0 | 40 | 70 | 1000 |
| 2 | 0 | 40 | 70 | 1000 |
| 3 | 100 | 40 | 70 | 1000 |
| 4 | 120 | 40 | 60 | 1000 |
| 5 | 80 | 40 | 60 | 1000 |
| 6 | 0 | 40 | 70 | 1000 |
| 7 | 0 | 40 | 70 | 1000 |
| 8 | 0 | 40 | 70 | 1000 |
| 9 | 0 | 40 | 70 | 1000 |
| 10 | 0 | 40 | 70 | 1000 |

TABLE 3

Line parameters for an electrical power system

| Serial number | Head node | Tail node | Resistance (p.u.) | Reactance (p.u.) | Suscep-tance (p.u.) | Transmission power (MVA) |
|---|---|---|---|---|---|---|
| 0 | 0 | 1 | 0.0035 | 0.0411 | 0.6987 | 600 |
| 1 | 0 | 38 | 0.001 | 0.025 | 0.75 | 1000 |
| 2 | 1 | 2 | 0.0013 | 0.0151 | 0.2572 | 500 |
| 3 | 1 | 24 | 0.007 | 0.0086 | 0.146 | 500 |
| 4 | 1 | 29 | 0 | 0.0181 | 0 | 900 |
| 5 | 2 | 3 | 0.0013 | 0.0213 | 0.2214 | 500 |
| 6 | 2 | 17 | 0.0011 | 0.0133 | 0.2138 | 500 |
| 7 | 3 | 4 | 0.0008 | 0.0128 | 0.1342 | 600 |
| 8 | 3 | 13 | 0.0008 | 0.0129 | 0.1382 | 500 |
| 9 | 4 | 5 | 0.0002 | 0.0026 | 0.0434 | 1200 |
| 10 | 4 | 7 | 0.0008 | 0.0112 | 0.1476 | 900 |

TABLE 3-continued

Line parameters for an electrical power system

| Serial number | Head node | Tail node | Resistance (p.u.) | Reactance (p.u.) | Suscep-tance (p.u.) | Transmission power (MVA) |
|---|---|---|---|---|---|---|
| 11 | 5 | 6 | 0.0006 | 0.0092 | 0.113 | 900 |
| 12 | 5 | 10 | 0.0007 | 0.0082 | 0.1389 | 480 |
| 13 | 5 | 30 | 0 | 0.025 | 0 | 1800 |
| 14 | 6 | 7 | 0.0004 | 0.0046 | 0.078 | 900 |
| 15 | 7 | 8 | 0.0023 | 0.0363 | 0.3804 | 900 |
| 16 | 8 | 38 | 0.001 | 0.025 | 1.2 | 900 |
| 17 | 9 | 10 | 0.0004 | 0.0043 | 0.0729 | 600 |
| 18 | 9 | 12 | 0.0004 | 0.0043 | 0.0729 | 600 |
| 19 | 9 | 31 | 0 | 0.02 | 0 | 900 |
| 20 | 11 | 10 | 0.0016 | 0.0435 | 0 | 500 |
| 21 | 11 | 12 | 0.0016 | 0.0435 | 0 | 500 |
| 22 | 12 | 13 | 0.0009 | 0.0101 | 0.1723 | 600 |
| 23 | 13 | 14 | 0.0018 | 0.0217 | 0.366 | 600 |
| 24 | 14 | 15 | 0.0009 | 0.0094 | 0.171 | 600 |
| 25 | 15 | 16 | 0.0007 | 0.0089 | 0.1342 | 600 |
| 26 | 15 | 18 | 0.0016 | 0.0195 | 0.304 | 600 |
| 27 | 15 | 20 | 0.0008 | 0.0135 | 0.2548 | 600 |
| 28 | 15 | 23 | 0.0003 | 0.0059 | 0.068 | 600 |
| 29 | 16 | 17 | 0.0007 | 0.0082 | 0.1319 | 600 |
| 30 | 16 | 26 | 0.0013 | 0.0173 | 0.3216 | 600 |
| 31 | 18 | 19 | 0.0007 | 0.0138 | 0 | 900 |
| 32 | 18 | 32 | 0.0007 | 0.0142 | 0 | 900 |
| 33 | 19 | 33 | 0.0009 | 0.018 | 0 | 900 |
| 34 | 20 | 21 | 0.0008 | 0.014 | 0.2565 | 900 |
| 35 | 21 | 22 | 0.0006 | 0.0096 | 0.1846 | 600 |
| 36 | 21 | 34 | 0 | 0.0143 | 0 | 900 |
| 37 | 22 | 23 | 0.0022 | 0.035 | 0.361 | 600 |
| 38 | 22 | 35 | 0.0005 | 0.0272 | 0 | 900 |
| 39 | 24 | 25 | 0.0032 | 0.0323 | 0.531 | 600 |
| 40 | 24 | 36 | 0.0006 | 0.0232 | 0 | 900 |
| 41 | 25 | 26 | 0.0014 | 0.0147 | 0.2396 | 600 |
| 42 | 25 | 27 | 0.0043 | 0.0474 | 0.7802 | 600 |
| 43 | 25 | 28 | 0.0057 | 0.0625 | 1.029 | 600 |
| 44 | 27 | 28 | 0.0014 | 0.0151 | 0.249 | 600 |
| 45 | 28 | 37 | 0.0008 | 0.0156 | 0 | 1200 |

TABLE 4

Pipeline parameters for a gas system

| Serial number | Head node | Tail node | Minimum transmission rate (1000 m3/h) | Maximum transmission rate (1000 m3/h) | Weymouth coefficient ((bar/(1000 m3/h))^2) |
|---|---|---|---|---|---|
| 0 | 0 | 1 | −1100 | 1100 | 0.058913 |
| 1 | 6 | 7 | −1100 | 1100 | 0.058913 |
| 2 | 2 | 8 | −1100 | 1100 | 0.061036 |
| 3 | 7 | 3 | −1100 | 1100 | 0.066929 |
| 4 | 7 | 9 | −1100 | 1100 | 0.077628 |
| 5 | 8 | 9 | −1100 | 1100 | 0.061036 |
| 6 | 10 | 4 | −1100 | 1100 | 0.063635 |
| 7 | 10 | 5 | −1100 | 1100 | 0.071318 |

TABLE 5

Parameters for a gas valve

| Serial number | Head node | Tail node | Upper limit of pressure difference (bar) | Minimum transmission rate (1000 m3/h) | Maximum transmission rate (1000 m3/h) |
|---|---|---|---|---|---|
| 0 | 6 | 8 | 120 | −1100 | 1100 |

TABLE 6

| | | | | | Minimum transmission rate | Maximum transmission rate | |
|---|---|---|---|---|---|---|---|
| Serial number | Head node | Tail node | Minimum compression ratio | Maximum compression ratio | (1000 m3/h) | (1000 m3/h) | Gas-driven ratio |
| 0 | 1 | 6 | 1.2 | 2.8 | 0 | 1100 | 0.035 |
| 1 | 9 | 10 | 1.2 | 2.8 | 0 | 1100 | 0.035 |

TABLE 7

Parameters for a thermal power unit

| Serial number | Node | Minimum active power (MW) | Maximum active power (MW) | Minimum reactive power (MVAr) | Maximum reactive power (MVAr) | c2 ($/MWh2) | c1 ($/MWh) | c0 ($/h) |
|---|---|---|---|---|---|---|---|---|
| 0 | 29 | 0 | 1040 | 140 | 400 | 0.01 | 0.3 | 0.2 |
| 1 | 30 | 0 | 646 | −100 | 300 | 0.01 | 0.3 | 0.2 |
| 2 | 32 | 0 | 652 | 0 | 250 | 0.01 | 0.3 | 0.2 |
| 3 | 33 | 0 | 508 | 0 | 167 | 0.01 | 0.3 | 0.2 |
| 4 | 34 | 0 | 687 | −100 | 300 | 0.01 | 0.3 | 0.2 |
| 5 | 35 | 0 | 580 | 0 | 240 | 0.01 | 0.3 | 0.2 |
| 6 | 36 | 0 | 564 | 0 | 250 | 0.01 | 0.3 | 0.2 |
| 7 | 38 | 0 | 1100 | −100 | 300 | 0.01 | 0.3 | 0.2 |

TABLE 8

Parameters for nature gas source

| Serial number | Node | Minimum gas supply rate (1000 m3/h) | Maximum gas supply rate (1000 m3/h) | Gas supply cost ($/1000 m3) |
|---|---|---|---|---|
| 0 | 0 | 50 | 750 | 88.80555 |
| 1 | 1 | 0 | 500 | 88.80555 |
| 2 | 2 | 100 | 500 | 88.80555 |

TABLE 9

Parameters for a gas generator

| Serial number | Electric power node | Gas node | Minimum active power (MW) | Maximum active power (MW) | Minimum reactive power (MVAr) | Maximum reactive power (MVAr) | Conversion ratio (1000 m3/MW) |
|---|---|---|---|---|---|---|---|
| 0 | 31 | 3 | 0 | 725 | 150 | 300 | 0.25 |
| 1 | 37 | 1 | 0 | 865 | −150 | 300 | 0.25 |

Taking the above electricity-gas interlinking hybrid energy system as an example, a calculation for optimal energy flow is carried out for a unit time section, a time scale is set to one hour, and a threshold value for the unbalance magnitude of the non-convex constraint is set to 0.1%. The main technical indexes of the algorithm are as shown in Table 10.

TABLE 10

The main technical indexes

| Objective function value | Unbalance magnitude | Calculation time |
|---|---|---|
| 17647.89 RMB | 0.06945% | 0.194031 seconds |

The results show that the method for calculating an optimal energy flow of an integrated electricity-gas system based on sequential convex programming provided by the present disclosure can effectively obtain the objective function value of the problem, and the calculation time is only 0.194 seconds on the premise of ensuring that the maximum value for the unbalance magnitude of the non-convex constraint does not exceed 0.1% of the threshold value, and the feasibility and efficiency of the optimal energy flow algorithm are considered.

In the description of this specification, the reference terms "an embodiment", "example", "specific example", etc., are used to refer to the specific features, structures, materials or characteristics described in conjunction with the embodiments or examples, which are included in at least one embodiment or example of the present disclosure. In this specification, schematic representations of the above terms do not necessarily refer to identical embodiments or examples. Furthermore, the specific features, structures, materials or characteristics described may be combined in an appropriate manner in any one or more embodiments or examples.

The above disclosed preferred embodiments of the present disclosure are only intended to help explain the present disclosure. The preferred embodiments do not describe all of the details and do not limit the present disclosure to the specific embodiments described. It will be apparent that many modifications and changes can be made can be made according to the contents of this specification. These embodiments are selected and described in details in this specification to better explain the principle and practical application of the present disclosure, so that those skilled in the art would better understand and utilize the present disclosure. The present disclosure is only limited by the claims and its full scope and equivalents.

What is claimed is:

1. A method for calculating an optimal energy flow of an integrated electricity-gas system based on sequential convex programming, wherein integrated electricity-gas system includes an electrical power system having a plurality of thermal power unit nodes and a gas system having nature gas source nodes, and the method comprises following steps:

establishing an electrical power flow model of the electrical power system and a gas power flow model of the gas system;

determining a predetermined parameter of each thermal power unit node of the electrical power system and a predetermined parameter of each nature gas source node of the gas system in the integrated electricity-gas hybrid energy system;

establishing a convex optimization part of the optimal energy flow model according to the predetermined parameter of each thermal power unit node and the predetermined parameter of each nature gas source node;

establishing, in an integrated electricity-gas hybrid energy system, a convex relaxation formula of a quadratic constraint of the optimal energy flow model, and expanding, by a first order Taylor expansion, a convex function at a relaxation solution to form an expansion formula;

giving a precision requirement threshold value of a non-convex constraint, comparing the threshold value with an unbalance magnitude of the non-convex constraint in the expansion formula;

iterating, in response to the unbalance magnitude being greater than the threshold value, the expansion formula into a solution model of the integrated electricity-gas hybrid energy system until the unbalance magnitude is not greater than the threshold value, to obtain a relaxation solution in the solution model, wherein, constraints in the electricity-gas interlinking hybrid energy system include a power flow constraint of the electrical power system and a power flow constraint of the gas system, the electrical power flow model of the electrical power system and the gas power flow model of the gas system are both quadratic nonlinear models, wherein the optimal energy flow of the integrated electricity-gas system is efficiently determined based on the obtained relaxation solution, and wherein the integrated electricity-gas system is controlled according to the determined optimal energy flow.

2. The method for calculating the optimal energy flow of the integrated electricity-gas system based on sequential convex programming according to claim 1, wherein the iterating the expansion formula into a solution model of the integrated electricity-gas hybrid energy system includes:

giving, the precision requirement threshold value of the non-convex constraint, comparing an unbalance magnitude obtained from a difference of the convex relaxation formula of the quadratic constraint with the threshold value;

solving, in response to the unbalance magnitude being not greater than a set precision requirement threshold value of the non-convex constraint, the expansion formula according to an energy flow model;

introducing, in response to the unbalance magnitude being greater than the set precision requirement threshold value of the non-convex constraint, the first order Taylor expansion at the relaxation solution of the convex function into the model as a penalty term, recalculating, the model relaxation solution with the penalty term;

comparing, before calculating the model relaxation solution with the penalty term, an unbalance magnitude of an solved expansion formula of the relaxation formula with the penalty term with the threshold value, iterating, in response to the unbalance magnitude being greater than the set precision requirement threshold value of the non-convex constraint, the penalty term until the unbalance magnitude is not greater than the set precision requirement threshold value of the non-convex constraint.

3. The method for calculating the optimal energy flow of the integrated electricity-gas system based on sequential convex programming according to claim 1, wherein establishing, an objective function of the convex optimization part of the optimal energy flow model in the integrated electricity-gas system:

$$\min \sum_{i \in \Omega_c} \left[ C_i^a (p_i^c)^2 + C_i^b p_i^c + C_i^c \right] + \sum_{i \in \Omega_s} C_m^f f_m^s,$$

where sets $\Omega_c$ and $\Omega_s$ represent a thermal power unit node set and a nature gas source node set respectively, a variable $$p_i^c$$

represents an active power of the thermal power unit, a variable $$f_m^s$$

represents a gas supply rate of the nature gas source, parameters $$C_i^a, C_i^b \text{ and } C_i^c$$

represent a second-order term coefficient, a first-order term coefficient and a zero-order term coefficient of the fuel cost in the thermal power unit respectively, and $$C_m^f$$

represents a gas supply cost coefficient of the nature gas source.

4. The method for calculating the optimal energy flow of the integrated electricity-gas system based on sequential convex programming according to claim 3, wherein a linear part of the power flow constraint of the electrical power system is as follows:

$$\sum_{ji\in\beta_i}(p_{ji}-l_{ji}R_{ji})-\sum_{ik\in\alpha_i}p_{ik}+p_i^c+p_i^g=D_i^p, \forall\, i\in\Omega_b$$

$$\sum_{ji\in\beta_i}(q_{ji}-l_{ji}X_{ji})-\sum_{ik\in\alpha_i}q_{ik}+q_i^c+q_i^g=D_i^q, \forall\, i\in\Omega_b$$

$$v_i-2(p_{ij}R_{ij}+q_{ij}X_{ij})+l_{ij}(R_{ij}^2+X_{ij}^2)=v_j, \forall\, ij\in\Omega_l$$

$$(V_i^{min})^2\le v_i\le(V_i^{max})^2, \forall\, i\in\Omega_b$$

$$P_{c,i}^{min}\le p_i^c\le P_{c,i}^{max}, Q_{c,i}^{min}\le q_i^c\le Q_{c,i}^{max}, \forall\, i\in\Omega_c$$

$$P_{g,i}^{min}\le p_i^g\le P_{g,i}^{max}, Q_{g,i}^{min}\le q_i^g\le Q_{g,i}^{max}, \forall\, i\in\Omega_g$$

$$P_{ij}^{min}\le p_{ij}\le P_{ij}^{max}, \forall\, ij\in\Omega_l$$

$$Q_{ij}^{min}\le q_{ij}\le Q_{ij}^{max}, \forall\, ij\in\Omega_l$$

$$0\le l_{ij}\le(I_{ij}^{max})^2, \forall\, ij\in\Omega_l,$$

where sets $\Omega_b$, $\Omega_l$, and $\Omega_g$ represent an electrical grid node set, an electrical transmission line set and a gas generator node set respectively, sets $\alpha_i$ and $\beta_i$ represent an electrical transmission line set with a node i as a head-terminal node and an electrical transmission line set with the node i as a tail-terminal node respectively, variables $p_{ij}$, $p_{ji}$ and $p_{ik}$ represent active powers flowing over lines ij, ji and ik, $q_{ij}$, $q_{ji}$ and $q_{ik}$ represent reactive powers flowing over the lines ij, ji and ik, $l_{ij}$ and $l_{ji}$ represent squares of currents flowing over the lines ij and ji, $$p_i^c \text{ and } q_i^c$$

represent an active power and a reactive power output by the thermal power unit respectively, $$p_i^g \text{ and } q_i^g$$

represent an active power and a reactive power output by the gas generator respectively, $v_i$ and $v_j$ represent squares of voltage amplitudes of the node i and a node j, parameters $R_{ij}$ and $R_{ji}$ represent resistances on the line ij and the line ji respectively, $X_{ij}$ and $X_{ji}$ represent reactances on the line ij and the line ji respectively, $$D_i^p \text{ and } D_i^q$$

represent an active load and a reactive load of the node i respectively, $$V_i^{min} \text{ and } V_i^{max}$$

represent a lower limit and an upper limit of the voltage amplitude of the node i respectively, $$P_{c,i}^{min} \text{ and } P_{c,i}^{max}$$

represent a lower limit and an upper limit of the active power output by a thermal power unit i respectively, $$Q_{c,i}^{min} \text{ and } Q_{c,i}^{max}$$

represent a lower limit and an upper limit of the reactive power output by the thermal power unit i respectively, $$P_{g,i}^{min} \text{ and } P_{g,i}^{max}$$

represent a lower limit and an upper limit of the active power output by a gas power unit i respectively, $$Q_{g,i}^{min} \text{ and } Q_{g,i}^{max}$$

represent a lower limit and an upper limit of the reactive power output by the gas power unit i respectively, $$P_{ij}^{min} \text{ and } P_{ij}^{max}$$

represent a transmission lower limit and a transmission upper limit of the active power on an electrical transmission line ij respectively, $$Q_{ij}^{min} \text{ and } Q_{ij}^{max}$$

represent a transmission lower limit and a transmission upper limit of the reactive power on the electrical transmission line ij respectively, $$I_{ij}^{max}$$

represents a heat stable current value for the line ij.

5. The method for calculating the optimal energy flow of the integrated electricity-gas system based on sequential convex programming according to claim 4, wherein a linear part of the power flow constraint of the gas system is as follows:

$$\sum_{im \in \delta_m} (e_{im} - \tau_{im}) - \sum_{mn \in \gamma_m} e_{mn} - \sum_{mn \in \Xi_m} f_{mn} + f_m^s - f_m^g = D_m^g, \forall\, m \in \Omega_n$$

$$\tau_{mn} = K_{mn}e_{mn}, \forall\, mn \in \Omega_k$$

$$(H_{mn}^{min})^2 \pi_m \le \pi_n \le (H_{mn}^{max})^2 \pi_m, \forall\, mn \in \Omega_k$$

$$p_i^g = T_m f_m^g, \forall\, i, m \in \Omega_g$$

$$\left(\prod_m^{min}\right)^2 \le \pi_m \le \left(\prod_m^{max}\right)^2, \forall\, m \in \Omega_n$$

$$-F_{mn}^{max} \le f_{mn} \le F_{mn}^{max}, \forall\, mn \in \Omega_p$$

$$0 \le e_{mn} \le E_{mn}^{max}, \forall\, mn \in \Omega_k$$

$$0 \le f_m^g \le F_{g,m}^{max}, \forall\, m \in \Omega_g$$

$$F_{s,m}^{min} \le f_m^s \le F_{s,m}^{max}, \forall\, m \in \Omega_s,$$

where sets $\Omega^n$, $\Omega_p$ and $\Omega_k$ represent a gas node set, a gas pipeline set and a nature gas compressor set respectively, sets $\delta_m$ and $\gamma_m$ represent a gas pipeline set with a node m as a head-terminal node and a gas pipeline set with the node m as a tail-terminal node respectively, $\Xi_m$ represents a nature gas compressor set with the node m as a gas-intake node, $e_{im}$ and $e_{mn}$ represent a gas amount flowing through a nature gas compressor im and a gas amount flowing through a nature gas compressor mn, $\tau_{im}$ and $\tau_{mn}$ represent a gas amount consumed by the nature gas compressor im and a gas amount consumed by the nature gas compressor mn respectively, $f_{mn}$ represents a gas amount flowing through a gas pipeline mn, $$f_m^s$$

represents a nature gas amount injected into the node m by the nature gas source per unit time, $$f_m^g$$

represents a gas consumption amount by a gas generator connected to the node m per unit time, $\pi_m$ and $\pi_n$ represent squares of gas pressure values at the node m and a node n respectively, a parameter $$D_m^g$$

represents a gas load at the node m, $W_{mn}$ represents a Weymouth coefficient of a gas transmission pipeline mn, $K_{mn}$ represents a ratio coefficient of a gas compression amount and a gas consumption amount per unit time of the nature gas compressor, $$H_{mn}^{min} \text{ and } H_{mn}^{max}$$

represent a lower limit and an upper limit of a compression ratio of the nature gas compressor, $T_m$ represents a ratio coefficient of the gas consumption amount and a power generation amount of the gas generator, $$\prod_m^{min} \text{ and } \prod_m^{max}$$

represent a lower limit and an upper limit of a nodal pressure, generator, $$F_{mn}^{min} \text{ and } F_{mn}^{max}$$

represent a lower limit and an upper limit of a gas transmission amount of the gas pipeline mn per unit time, $$E_{mn}^{max}$$

represents an upper limit of a compression rate of the nature gas compressor, $$F_{g,m}^{max}$$

represents an upper limit of a gas consumption rate of the gas generator, $$F_{s,m}^{min} \text{ and } F_{s,m}^{max}$$

represent a lower limit and an upper limit of a gas supply amount of the nature gas source per unit time.

6. The method for calculating the optimal energy flow of the integrated electricity-gas system based on sequential convex programming according to claim 5, wherein the model is expressed in a matrix form:

$$\min x^T Q x + c x + d$$

$$\text{s.t. } A x \le b,$$

where matrices Q, c, d represent a second-order term coefficient, a first-order term coefficient and a constant term matrix in the objective function respectively, a matrix A represents a coefficient matrix in the linear constraint, and b represents a constant term coefficient matrix in the linear constraint.

7. The method for calculating the optimal energy flow of the integrated electricity-gas system based on sequential convex programming according to claim 3, wherein the convex relaxation formula of the quadratic constraint of the electricity-gas interlinking hybrid energy system is:

$$(p_{ij})^2 + (q_{ij})^2 \le v_i l_{ij}, \forall ij \in \Omega_l$$

$$W_{mn}(f_{mn})^2 \le \pi_m - \pi_n, \forall mN \in \Omega_p,$$

the first order Taylor expansion is:

$$(l_{ij} + v_i)^2 - 8p_{ij}^* p_{ij} - 8q_{ij}^* q_{ij} +$$

$$4(p_{ij}^*)^2 + 4(q_{ij}^*)^2 + (l_{ij}^* - v_i^*)^2 - 2(l_{ij}^* - v_i^*)(l_{ij} - v_i) \le \mu_{ij}^l,$$

$$\forall\, ij \in \Omega_l (\pi_m - \pi_n) - 2W_{mn} f_{mn}^* f_{mn} + W_{mn}(f_{mn}^*)^2 \le \mu_{mn}^p, \forall\, mn \in \Omega_p,$$

$$\text{where } p_{ij}^*, q_{ij}^*, l_{ij}^*, v_i^* \text{ and } f_{mn}^*$$

respectively represent a given value for a corresponding variable, namely, a value for a line active power, a value for a line reactive power, a square value for a line current, a square value for a node voltage, and a value for a pipeline gas flow optimized and obtained in a previous iteration, variables $$\mu_{ij}^l \text{ and } \mu_{mn}^p$$

respectively represent an unbalance magnitude of a non-convex constraint of a corresponding line ij and the gas transmission pipeline mn.

\* \* \* \* \*